(12) United States Patent
Cheon

(10) Patent No.: US 10,571,608 B2
(45) Date of Patent: Feb. 25, 2020

(54) DISPLAY DEVICE

(71) Applicant: Samsung Display Co., Ltd., Yongin-Si, Gyeonggi-Do (KR)

(72) Inventor: Kyuhyeong Cheon, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/389,484

(22) Filed: Apr. 19, 2019

(65) Prior Publication Data

US 2019/0243037 A1 Aug. 8, 2019

Related U.S. Application Data

(63) Continuation of application No. 15/938,497, filed on Mar. 28, 2018, now Pat. No. 10,274,653.

(30) Foreign Application Priority Data

May 22, 2017 (KR) .......................... 10-2017-0062962

(51) Int. Cl.
*G02F 1/01* (2006.01)
*G02B 5/20* (2006.01)
*B32B 7/12* (2006.01)
*B32B 17/06* (2006.01)
*F21V 8/00* (2006.01)

(52) U.S. Cl.
CPC .................. *G02B 5/20* (2013.01); *B32B 7/12* (2013.01); *B32B 17/064* (2013.01); *B32B 2307/4023* (2013.01); *B32B 2307/41* (2013.01); *B32B 2457/208* (2013.01); *G02B 6/0011* (2013.01)

(58) Field of Classification Search
CPC ........ B32B 17/064; G02B 5/20; G02B 6/006; G02F 1/133524; G02F 2001/133331; G02F 2001/133311; G02F 2001/13332; H03K 2217/960785; H03K 2217/96079; H01H 9/182; H01H 2009/183
See application file for complete search history.

(56) References Cited

U.S. PATENT DOCUMENTS 8,934,073 B2* 1/2015 Seki .................. G02F 1/133512
349/110
9,483,965 B2 11/2016 Zhou et al.
9,619,092 B2 4/2017 Kim et al.
(Continued)

FOREIGN PATENT DOCUMENTS

KR 10-2011-0077554 A 7/2011
KR 10-2015-0072838 A 6/2015
(Continued)

*Primary Examiner* — Sean P Gramling
*Assistant Examiner* — Keith G. Delahoussaye
(74) *Attorney, Agent, or Firm* — Innovation Counsel LLP

(57) ABSTRACT

A display device includes a display panel and a window cover disposed on the display panel. The window cover includes an active area and a non-active area including an icon area. The window cover includes a window base substrate, a first color layer which is disposed on the window base substrate and covers the icon area, a second color layer which is disposed on the first color layer and in which a first opening overlapping with the icon area is defined, a light-blocking layer which is disposed on the second color layer and in which a second opening overlapping with the first opening is defined, and an icon layer filling the first opening and the second opening.

16 Claims, 10 Drawing Sheets

(56) References Cited

U.S. PATENT DOCUMENTS

| | | | |
|---|---|---|---|
| 2016/0154436 A1* | 6/2016 | Woo | G06F 1/1652 345/173 |
| 2016/0209577 A1* | 7/2016 | Ford | G02B 6/0036 |
| 2019/0019000 A1* | 1/2019 | Lee | G06K 9/0004 |

FOREIGN PATENT DOCUMENTS

| KR | 10-2015-0117037 A | | 10/2015 |
|---|---|---|---|
| KR | 20150117037 A | * | 10/2015 |

* cited by examiner

DISPLAY DEVICE

CROSS-REFERENCE TO RELATED APPLICATION

This application is a continuation application of U.S. patent application Ser. No. 15/938,497 filed on Mar. 28, 2018, which claims priority under 35 USC § 119 to Korean Patent Application No. 10-2017-0062962, filed on May 22, 2017, in the Korean Intellectual Property Office, the entire contents of which are hereby incorporated by reference.

BACKGROUND

1. Field

Embodiments of the present disclosure relate to a display device and, more particularly, to a display device that includes a window cover including an icon area.

2. Description of the Related Art

Various display devices such as liquid crystal display (LCD) devices and/or organic light emitting display devices (OLED) have been commercialized with the development of multimedia.

Screens of these display devices are exposed outward to provide visual information (e.g., an image) to a user. Since these screens are vulnerable to an external impact and a scratch, window covers are attached to display devices to protect the screens of the display devices.

A display device includes a plurality of icons for performing various functions such as adjustment of volume and selection of a menu and, for example, the window cover includes an area in which the icon is provided. When at least one among the icons is selected by a user, a function corresponding to the selected icon is performed. In other words, the display device may display an image corresponding to the selected icon. Generally, the icons are visible to a user regardless of whether they work or not.

SUMMARY

Embodiments of the present disclosure may provide a display device which is capable of easily adjusting a transmittance and a color of an icon as necessary and of which the icon is visible to a user in a specific mode.

In an aspect, a display device may include a display panel, and a window cover that is disposed on the display panel and includes an active area and a non-active area including an icon area. The window cover may include a window base substrate, a first color layer which is disposed on the window base substrate and covers the icon area, a second color layer which is disposed on the first color layer and in which a first opening overlapping with the icon area is defined, a light-blocking layer which is disposed on the second color layer and in which a second opening overlapping with the first opening is defined, and an icon layer filling the first opening and the second opening.

A width of the second opening may be smaller than a width of the first opening.

Each of the first and second color layers may have a first color, and the icon layer may have a second color different from the first color.

The first color and the second color may complement each other.

A portion of the light-blocking layer may cover at least a portion of an inner sidewall of the first opening.

A portion of the light-blocking layer may be in contact with the first color layer.

A portion of the icon layer may be disposed on the light-blocking layer.

The icon layer may include a first sub-icon layer filling the first opening, a second sub-icon layer filling the second opening, and a third sub-icon layer disposed under the second sub-icon layer and on a bottom surface of a portion of the light-blocking layer.

A width of the third sub-icon layer may be greater than a width of the first sub-icon layer and a width of the second sub-icon layer.

The display device may further include a third color layer disposed between the first color layer and the second color layer.

A third opening overlapping with the first opening may be defined in the third color layer.

A width of the third opening may be equal to a width of the first opening and greater than a width of the second opening.

The display device may further include a sub-substrate layer disposed between the window base substrate and the first color layer, and an adhesive layer disposed between the window base substrate and the sub-substrate layer.

The display device may further include an ultraviolet (UV) pattern layer disposed between the sub-substrate layer and the first color layer.

The display device may further include a reflection pattern layer covering at least a portion of the UV pattern layer.

The light-blocking layer may have a black color.

Each of the first and second color layers may include at least one of a metal particle, a pearl pigment, or a mirror ink.

The display device may further include an icon backlight unit disposed on the light-blocking layer and the icon layer.

The icon backlight unit may be fixed to the window cover.

The icon backlight unit may include a light source, and the light source may not overlap with the display panel when viewed in a plan view.

In an aspect, a display device may include a display panel, and a window cover that is disposed on the display panel and includes an active area and an icon area. The window cover may include a window base substrate, a multi-layered color layer that is disposed on the window base substrate and overlaps with the icon area, and an icon layer disposed at a lower side of the multi-layered color layer. The multi-layered color layer may include a lower layer covering the icon area, at least one intermediate layer in which an intermediate opening overlapping with the icon area is defined, and an upper layer in which an upper opening overlapping with the intermediate opening is defined. The upper layer may include a light-blocking material, and a portion of the upper layer may cover at least a portion of an inner sidewall of the intermediate opening.

In the display device according to an embodiment of the present disclosure, an icon is visible to a user only in a specific mode, and color feeling and light transmittance of the icon can be controlled as needed.

BRIEF DESCRIPTION OF THE DRAWINGS

The above and other aspects and features of the present disclosure will become more apparent by describing in further detail exemplary embodiments thereof with reference to the accompanying drawings, in which.

DETAILED DESCRIPTION OF THE EMBODIMENTS

Figure 1:
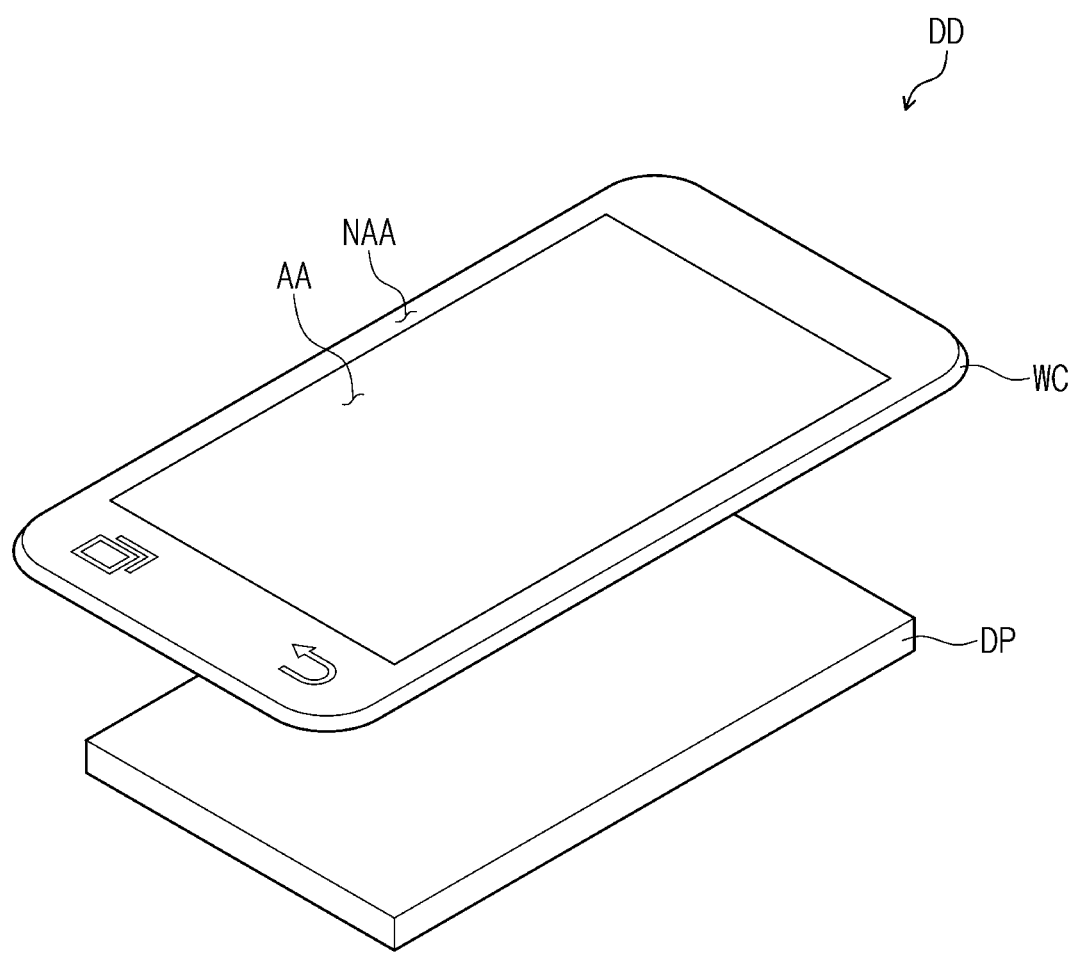
FIG. 1 is an exploded perspective view illustrating a display device according to an embodiment of the present disclosure.

The present disclosure now will be described more fully hereinafter with reference to the accompanying drawings, in which various embodiments are shown. This present disclosure may, however, be embodied in many different forms, and should not be construed as limited to the embodiments set forth herein. Rather, these embodiments are provided so that this disclosure will be thorough and complete, and will fully convey the scope of the present disclosure to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items. The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein. Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Hereinafter, a display device according to an embodiment will be described.

FIG. 1 is an exploded perspective view illustrating a display device DD according to an embodiment of the present disclosure.

Referring to FIG. 1, the display device DD according to an embodiment of the present disclosure includes a display panel DP and a window cover WC disposed on the display panel DP.

The window cover WC includes an active area AA, in which an image is displayed by light outputted from the display panel DD, and a non-active area NAA adjacent to the active area AA. The non-active area NAA is an area in which an image is not displayed by light outputted from the display panel DP. The active area AA may have a quadrilateral shape. The non-active area NAA may surround the active area AA when viewed in a plan view. However, embodiments of the present disclosure are not limited thereto. In certain embodiments, the shape of the active area AA and the shape of the non-active area NAA may be variously designed.

A top surface of each of members is parallel to a plane defined by a first directional axis DR1 and a second directional axis DR2. A thickness direction of the display device DD is parallel to a third directional axis DR3. The top surface (or an upper portion) and a bottom surface (or a lower portion) of each of the members are defined by the third directional axis DR3. However, directions indicated by the first to third directional axes DR1, DR2, and DR3 may be relative concepts and may be changed into other directions. Hereinafter, first to third directions are the directions indicated by the first to third directional axes DR1, DR2, and DR3, respectively, and are indicated by the same reference designators as the first to third directional axes DR1, DR2, and DR3.

Figure 2:
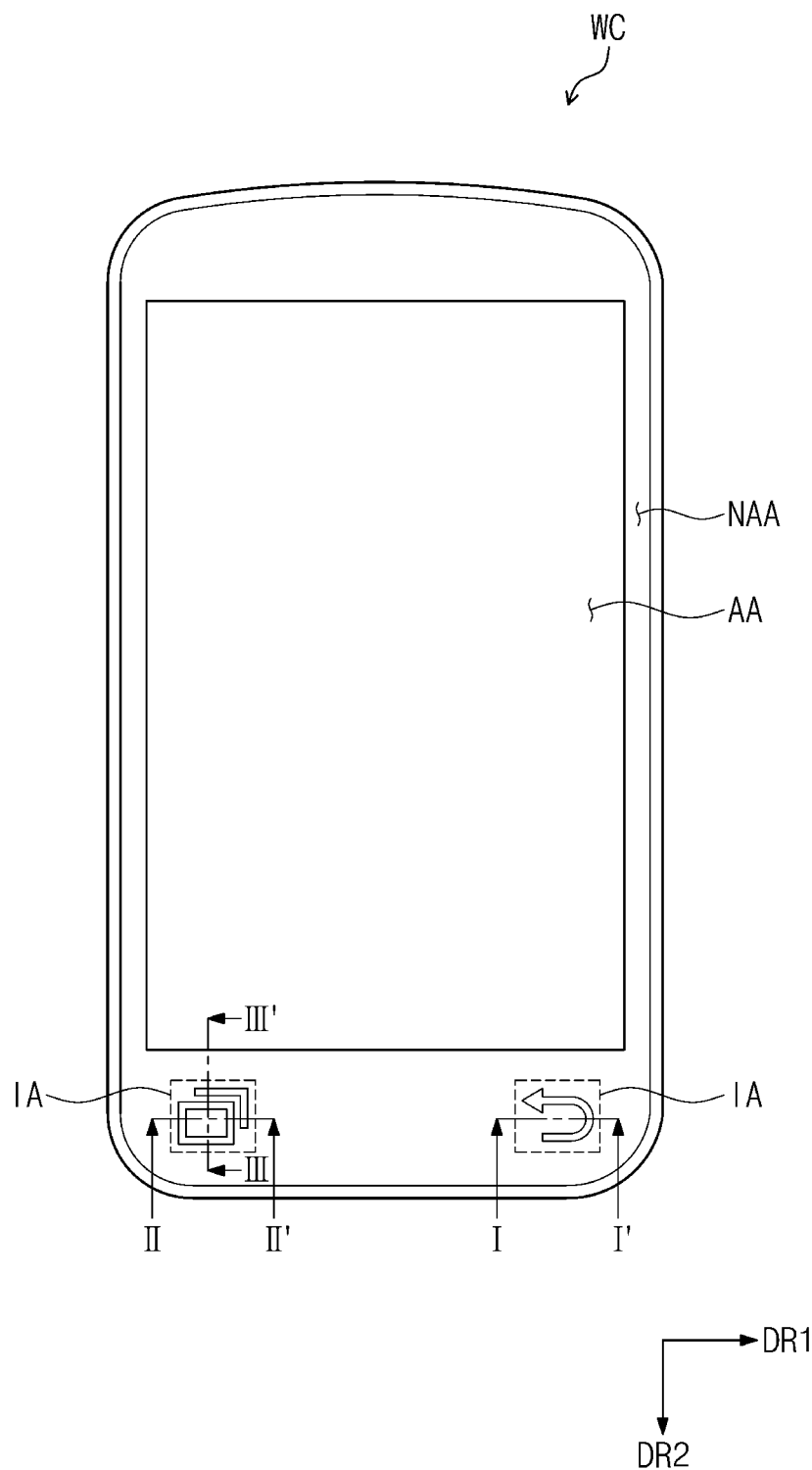
FIG. 2 is a plan view illustrating a window cover included in a display device according to an embodiment of the present disclosure.

FIG. 2 is a plan view illustrating a window cover WC included in a display device according to an embodiment of the present disclosure.

Referring to FIG. 2, the non-active area NAA includes an icon area IA in which an icon is displayed. In other words, a portion of the non-active area NAA corresponds to the icon area IA in which the icon is displayed. The number of the icon area IA may be changed as necessary, and two icon areas IA spaced apart from each other are illustrated as an example in FIG. 2.

Figure 3:
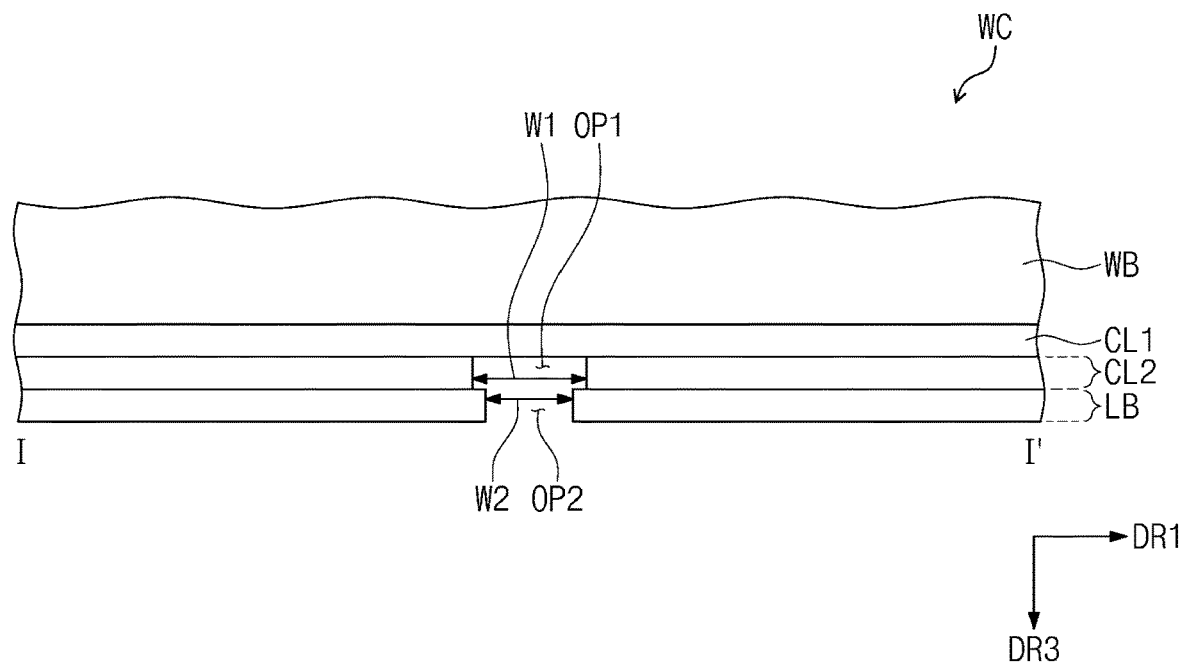
FIG. 3 is a schematic cross-sectional view corresponding to a line I-I' of FIG. 2.
Figure 4:
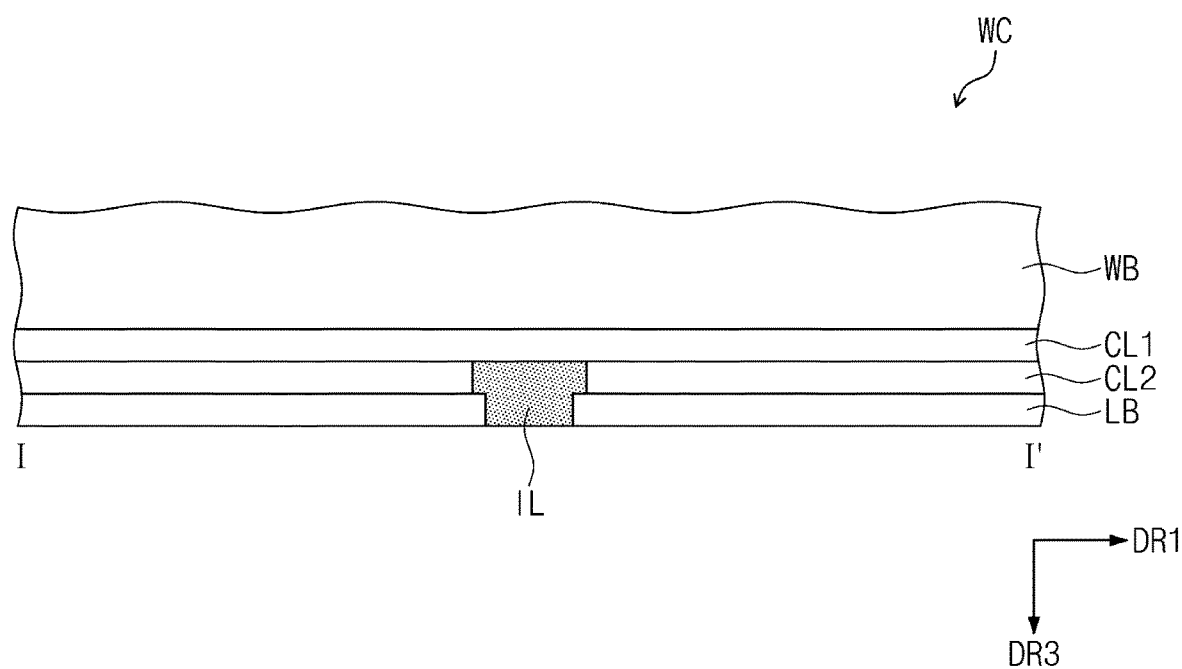
FIG. 4 is a schematic cross-sectional view corresponding to the line I-I' of FIG. 2 in accordance with one embodiment.

Hereinafter, the window cover WC will be described in more detail. FIGS. 3 and 4 are schematic cross-sectional views corresponding to a line I-I' of FIG. 2.

Referring to FIGS. 2 to 4, the window cover WC includes a window base substrate WB, a first color layer CL1 disposed on the window base substrate WB, a second color layer CL2 disposed on the first color layer CL1, and a light-blocking layer LB disposed on the second color layer CL2. For example, the first color layer CL1, the second color layer CL2, and the light-blocking layer LB may be sequentially stacked on a bottom surface of the window base substrate WB.

The window base substrate WB may be a general one known in the art. For example, the window base substrate WB may include at least one of tempered glass or reinforced plastic.

The first color layer CL1, the second color layer CL2, and the light-blocking layer LB are disposed on the non-active area NAA of the window cover WC. The active area AA of the window cover WC is exposed by the first color layer CL1, the second color layer CL2, and the light-blocking layer LB. The non-active area NAA of the window cover WC is entirely covered by the first color layer CL1.

A portion, corresponding to the non-active area NAA, of the bottom surface of the window base substrate WB may be entirely covered by the first color layer CL1, the second color layer CL2, and the light-blocking layer LB, except for a portion corresponding to (or overlapping with) first and second openings OP1 and OP2. Thus, it is possible to prevent light from being outputted through a portion except for a shape of the icon.

The first opening OP1 is defined in the second color layer CL2, and the second opening OP2 is defined in the light-blocking layer LB. The second opening OP2 overlaps with the first opening OP1. The first and second openings OP1 and OP2 are disposed in the icon area IA. The window cover WC includes an icon layer IL that fills the first opening OP1 and the second opening OP2. The first and second openings OP1 and OP2 may be completely filled with the icon layer IL. However, embodiments of the present disclosure are not limited thereto. In certain embodiments, a portion of the first opening OP1 may be filled with a portion of the light-blocking layer LB, and this will be described later in more detail.

A bottom surface of the first color layer CL1, which is exposed by the first and second openings OP1 and OP2, may be covered by the icon layer IL.

A width W2 of the second opening OP2 may be smaller than a width W1 of the first opening OP1. Each of the first color layer CL1, the second color layer CL2 and the light-blocking layer LB may be, for example, a printed layer formed by a printing process, and the width W2 of the second opening OP2 may be smaller than the width W1 of the first opening OP1 in consideration of a tolerance of the printing process.

Each of the first color layer CL1, the second color layer CL2, the light-blocking layer LB and the icon layer IL may be formed by a general method known in the art, for example, a silk-screen printing process. However, embodiments of the present disclosure are not limited thereto. In certain embodiments, an indirect printing process such as a PAD process may be used to form each of the first color layer CL1, the second color layer CL2 and the light-blocking layer LB.

An opening is not defined in the first color layer CL1. The icon area IA is covered by the first color layer CL1. Thus, the icon displayed in the icon area IA is visible to a user only when a backlight is driven. The icon is not clearly visible to the user in an off state of the backlight. In other words, in the display device DD of FIG. 1 according to an embodiment of the present disclosure, the icon is visible to a user in a specific mode in which the backlight providing light to the icon is driven. For example, when a touch is sensed in the icon area IA, the backlight providing the light to the icon is driven, and thus the icon can be visible or shown to a user. The backlight providing the light to the icon will be described later in more detail.

Each of the first and second color layers CL1 and CL2 may have a first color. In other words, the first and second color layers CL1 and CL2 may have the same color. A color of the non-active area NAA is determined by the first color of the first and second color layers CL1 and CL2. The icon layer IL may have a second color different from the first color. The second color of the icon layer IL may be determined depending on a finally desired icon color in consideration of a light transmittance of the first color. In other words, the second color of the icon layer IL can be variously changed as needed. For example, the icon layer IL may be formed by a process of thermally hardening a composition in which a pigment is dispersed in a transparent resin. A color of the pigment may be variously selected as needed.

For example, the first color and the second color may complement each other. In this case, the color of the icon finally visible to a user may be a white color.

Figure 5:
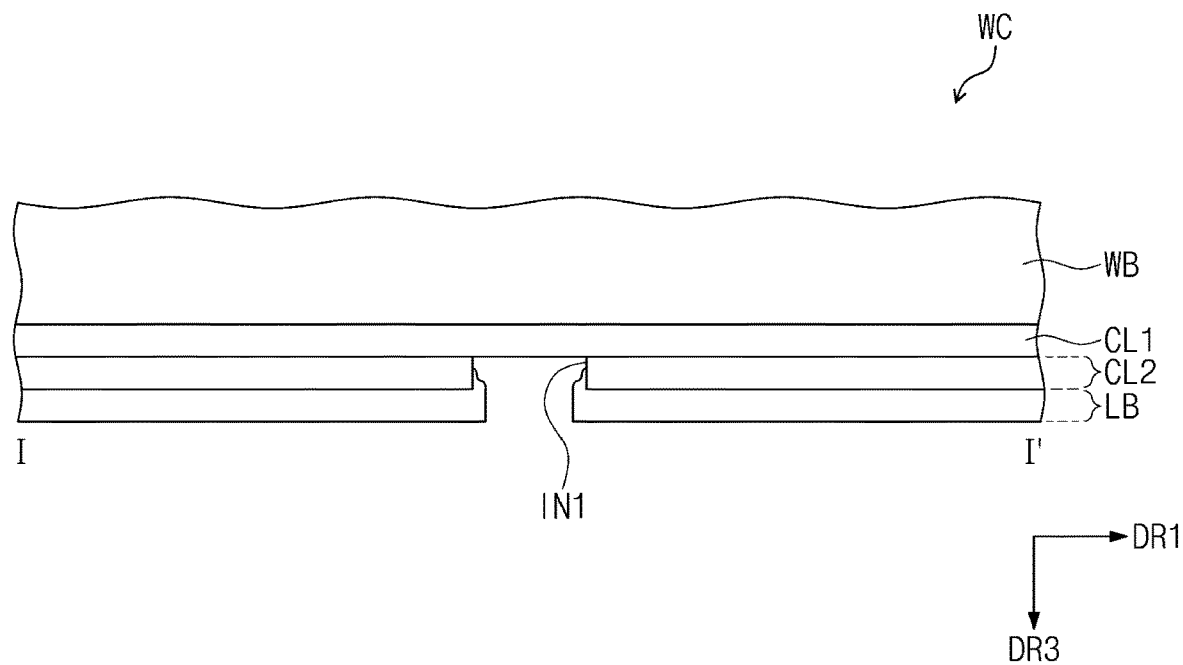
FIG. 5 is a schematic cross-sectional view corresponding to the line I-I' of FIG. 2 in accordance with yet another embodiment.
Figure 6:
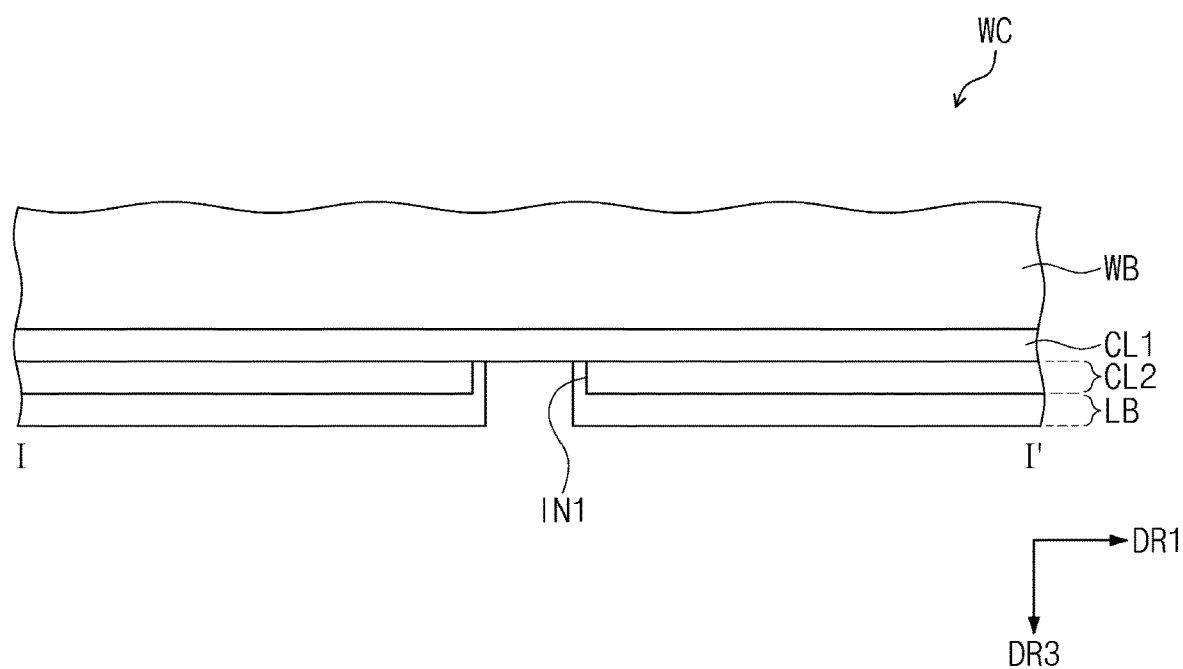
FIG. 6 is a schematic cross-sectional view corresponding to the line I-I' of FIG. 2 in accordance with yet another embodiment.

FIG. 5 is a schematic cross-sectional view corresponding to the line I-I' of FIG. 2 in accordance with another embodiment. FIG. 6 is a schematic cross-sectional view corresponding to the line I-I' of FIG. 2 in accordance with yet another embodiment. FIGS. 5, 6 are similar to FIG. 3 and only the significant differences between FIGS. 5, 6 and FIG. 3 are described below.

Referring to FIGS. 3, 5, and 6, a portion of the light-blocking layer LB may cover at least a portion of an inner sidewall IN1 of the first opening OP1. When the light-blocking layer LB is formed by the printing process, a material of the light-blocking layer LB may fill a portion of the first opening OP1 since the width W1 of the first opening OP1 is greater than the width W2 of the second opening OP2. As a result, the portion of the light-blocking layer LB may cover at least a portion of the inner sidewall IN1 of the first opening OP1 (FIG. 5). In some embodiments, the portion of the light-blocking layer LB may cover the entire inner sidewall IN1 of the first opening OP1 and be in contact with the first color layer CL1 (FIG. 6). However, embodiments of the present disclosure are not limited thereto.

Figure 7:
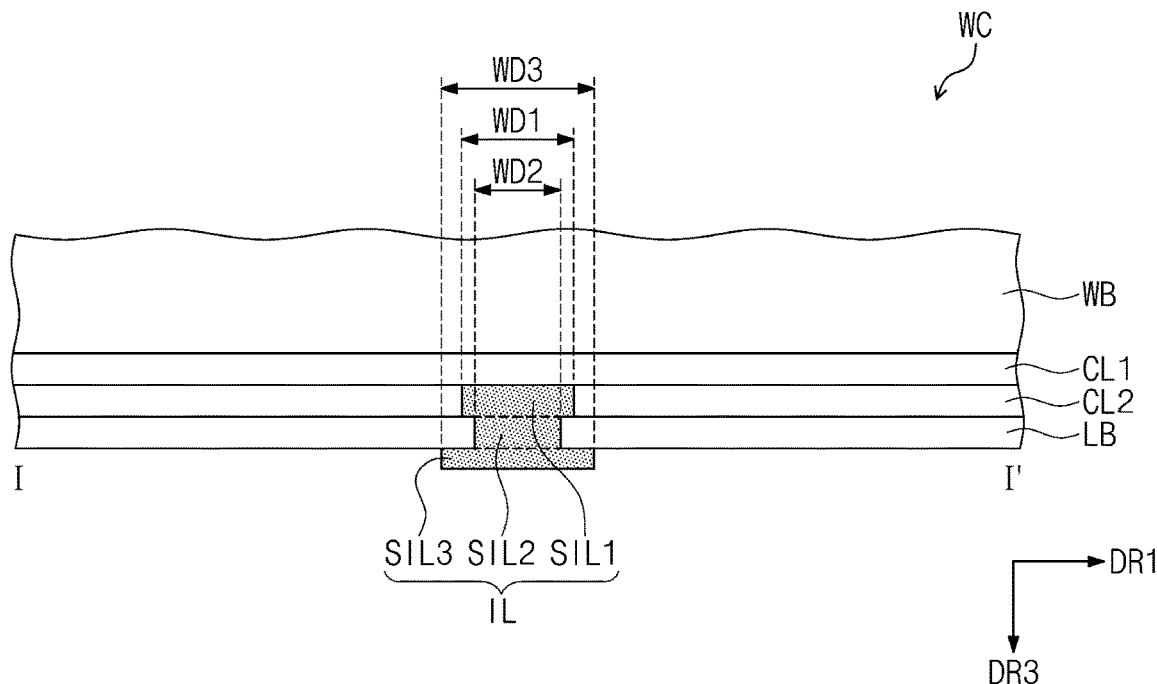
FIG. 7 is a schematic cross-sectional view corresponding to the line I-I' of FIG. 2 in accordance with yet another embodiment.

FIG. 7 is a schematic cross-sectional view corresponding to the line I-I' of FIG. 2 in accordance with another embodiment.

Referring to FIG. 7, a portion of the icon layer IL may be disposed on the light-blocking layer LB (e.g., on a bottom surface of the light-blocking layer LB). A delicate process design may be required in order that the icon layer IL fills the first and second openings OP1 and OP2 but is not formed outside the first and second openings OP1 and OP2. However, the portion of the icon layer IL may be formed on the light-blocking layer LB in an economical aspect as illustrated in FIG. 7. The portion of the icon layer IL disposed on the bottom surface of the light-blocking layer LB is not visible to a user due to the light-blocking layer LB, and thus it does not affect the shape of the icon, which is visible to the user.

In some embodiments, the icon layer IL may include a first sub-icon layer SIL1 filling the first opening OP1, a second sub-icon layer SIL2 filling the second opening OP2, and a third sub-icon layer SIL3 disposed on a bottom end of the second sub-icon layer SIL2 and a portion of the bottom surface of the light-blocking layer LB. The first, second, and third sub-icon layers SIL1, SIL2, and SIL3 may be integrally formed with each other.

Referring to FIGS. 3 and 7, a width WD1 of the first sub-icon layer SIL1 may be equal to the width W1 of the first opening OP1, and a width WD2 of the second sub-icon layer SIL2 may be equal to the width W2 of the second opening OP2. Thus, the width WD1 of the first sub-icon layer SIL1 may be greater than the width WD2 of the second sub-icon layer SIL2. However, embodiments of the present disclosure are not limited thereto. For example, in the case in which the portion of the light-blocking layer LB covers at least a portion of the inner sidewall IN1 of the first opening OP1 as illustrated in FIGS. 5 and 6, the width WD1 of the first sub-icon layer SIL1 is smaller than the width W1 of the first opening OP1. In this case, the width WD1 of the first sub-icon layer SIL1 may be substantially equal to the width WD2 of the second sub-icon layer SIL2. The width WD1 of the first sub-icon layer SIL1 may refer to the narrowest width of the first sub-icon layer SIL1.

A width WD3 of the third sub-icon layer SIL3 may be greater than the width WD1 of the first sub-icon layer SIL1 and the width WD2 of the second sub-icon layer SIL2. However, embodiments of the present disclosure are not limited thereto. For example, the width WD3 of the third sub-icon layer SIL3 may be greater than the width WD2 of the second sub-icon layer SIL2 and may be substantially equal to the width WD1 of the first sub-icon layer SIL1.

Figure 8:
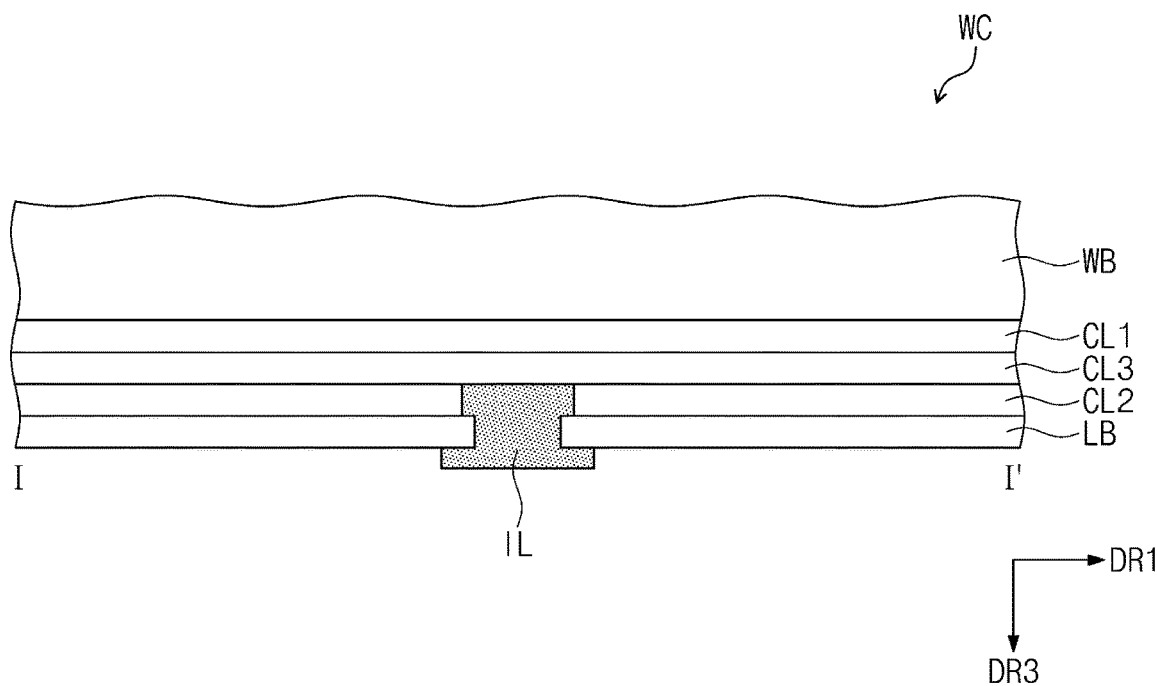
FIG. 8 is a schematic cross-sectional view corresponding to the line I-I' of FIG. 2 in accordance with yet another embodiment.

FIG. 8 is a schematic cross-sectional view corresponding to the line I-I' of FIG. 2 in accordance with one embodiment.

Referring to FIGS. 2 and 8, the window cover WC may further include a third color layer CL3 disposed between the first color layer CL1 and the second color layer CL2. The non-active area NAA of the window cover WC may include a three-color printed color layer. The third color layer CL3 may have the first color. A color of the non-active area NAA of the window cover WC is the same as the first color of the first, second, and third color layers CL1, CL2, and CL3.

The icon area IA may be covered by the first color layer CL1 and the third color layer CL3. Thus, the icon displayed in the icon area IA is visible to a user only when the backlight is driven. In other words, the icon is not clearly visible to the user in an off state of the backlight. Like the first color layer CL1, the third color layer CL3 may not have an opening but may cover the icon area IA. Thus, the icon may be even less visible to a user in the off state of the backlight providing light to the icon.

Figure 9A:
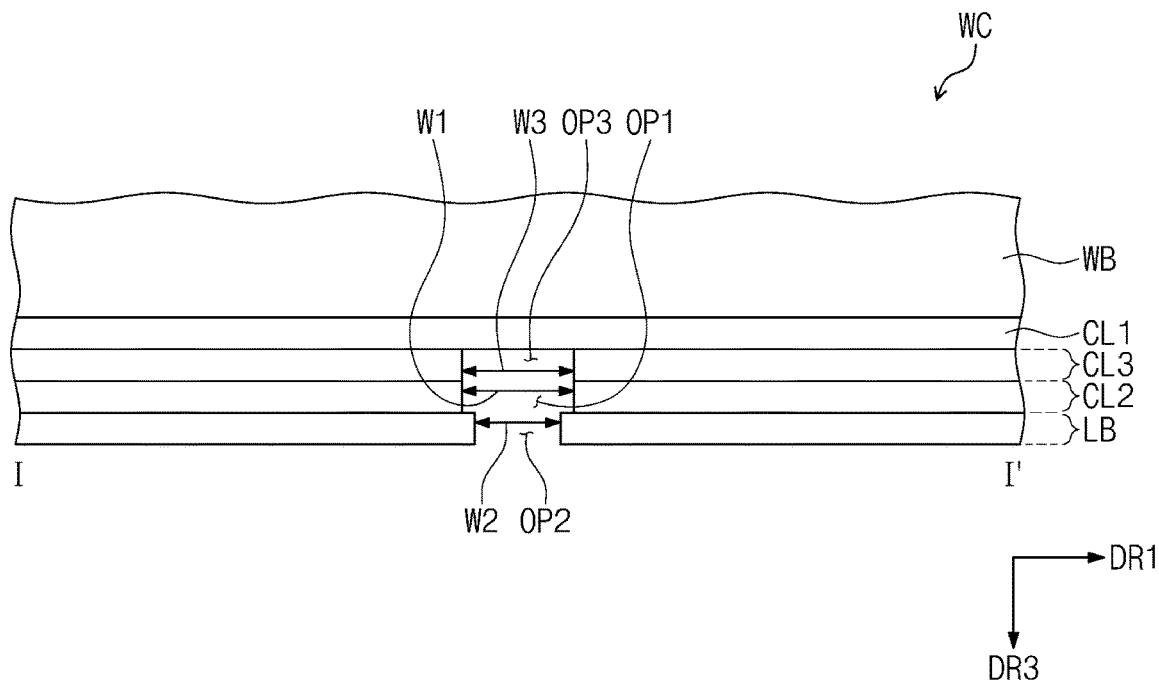
FIG. 9A is a schematic cross-sectional view corresponding to the line I-I' of FIG. 2 in accordance with yet another embodiment.
Figure 9B:
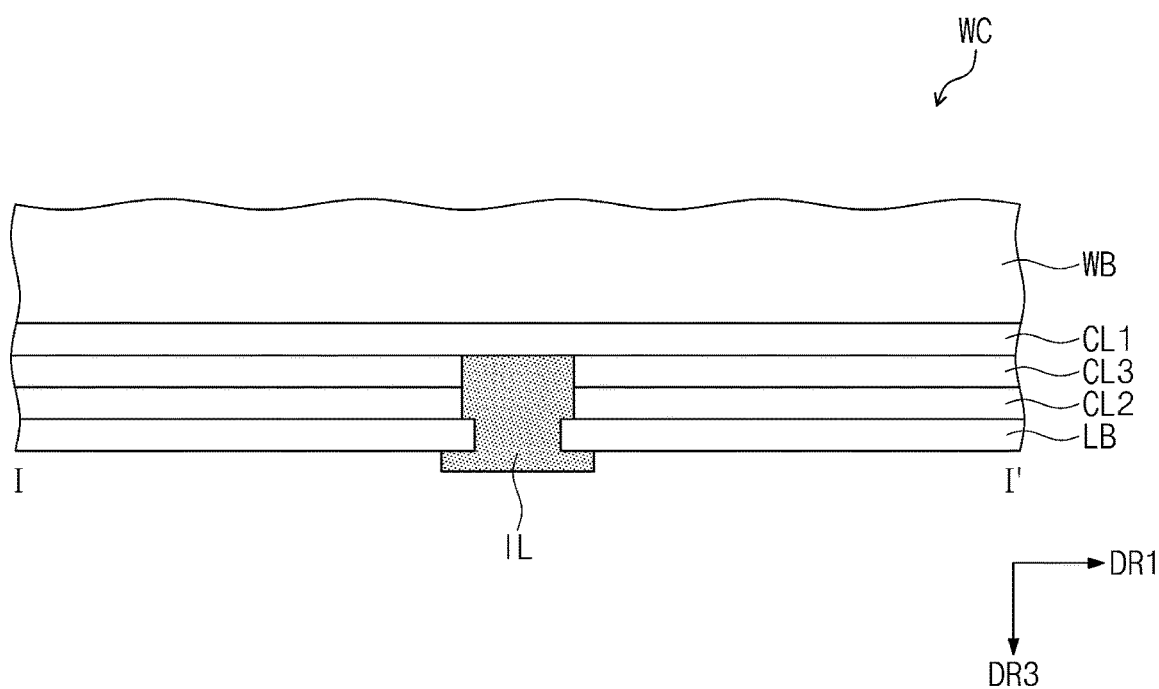
FIG. 9B is a schematic cross-sectional view corresponding to the line I-I' of FIG. 2 in accordance with yet another embodiment.

FIG. 9A is a schematic cross-sectional view corresponding to the line I-I' of FIG. 2 in accordance with one embodiment. FIG. 9B is a schematic cross-sectional view corresponding to the line I-I' of FIG. 2 in accordance with one embodiment.

Referring to FIGS. 9A and 9B, a third opening OP3 may be defined in the third color layer CL3 and may overlap with the first opening OP1. For example, in the event that the first color layer CL1 has the first color having a low light transmittance, the third opening OP3 may be defined in the third color layer CL3 to show the icon layer IL to a user. On the other hand, in the event that the first color layer CL1 has the first color having a relatively high light transmittance, the third opening OP3 may not be defined in the third color layer CL3. In other words, the third opening OP3 may be defined in the third color layer CL3 as needed.

A width W3 of the third opening OP3 may be equal to the width W1 of the first opening OP1. In this case, the first color layer CL1 and the third color layer CL3 may be formed by the same process. The width W3 of the third opening OP3 may be greater than the width W2 of the second opening OP2. The width W2 of the second opening OP2 may be smaller than the widths W1 and W3 of the first and third openings OP1 and OP3 in consideration of a process tolerance.

In the event that the third opening OP3 is defined in the third color layer CL3, the icon layer IL may be disposed to fill the first, second, and third openings OP1, OP2, and OP3, as illustrated in FIG. 9B. The bottom surface of the first color layer CL1, which is exposed by the first, second, and third openings OP1, OP2, and OP3, may be covered by the icon layer IL.

Figure 10:
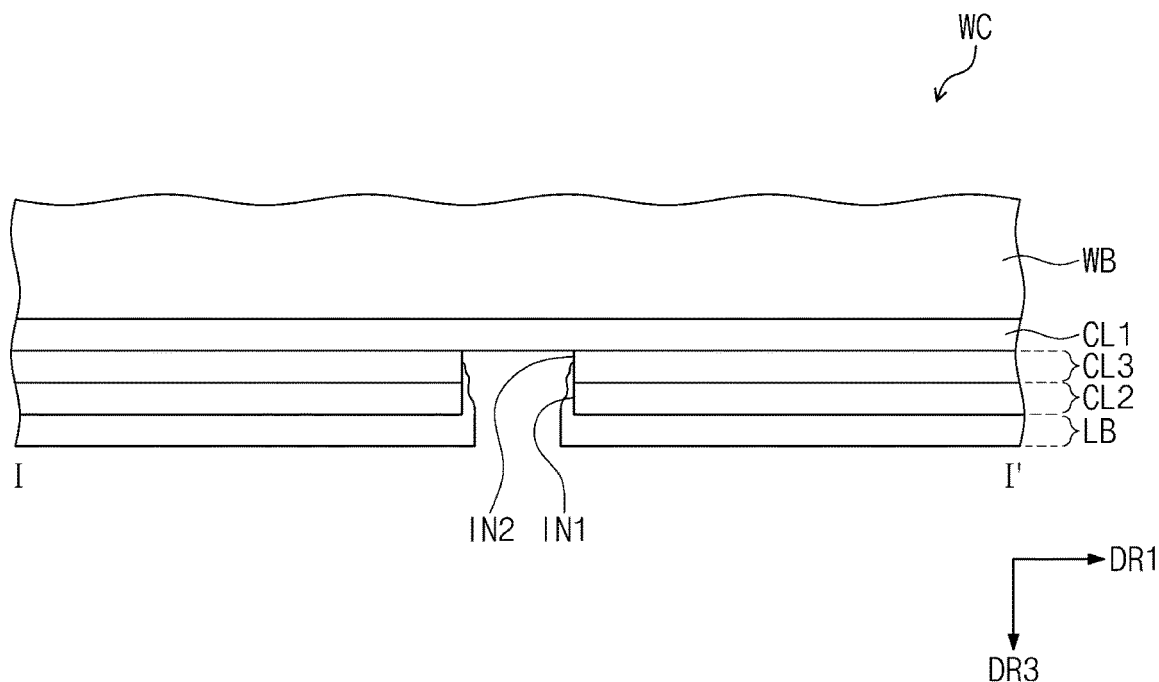
FIG. 10 is a schematic cross-sectional view corresponding to the line I-I' of FIG. 2 in accordance with yet another embodiment.
Figure 11:
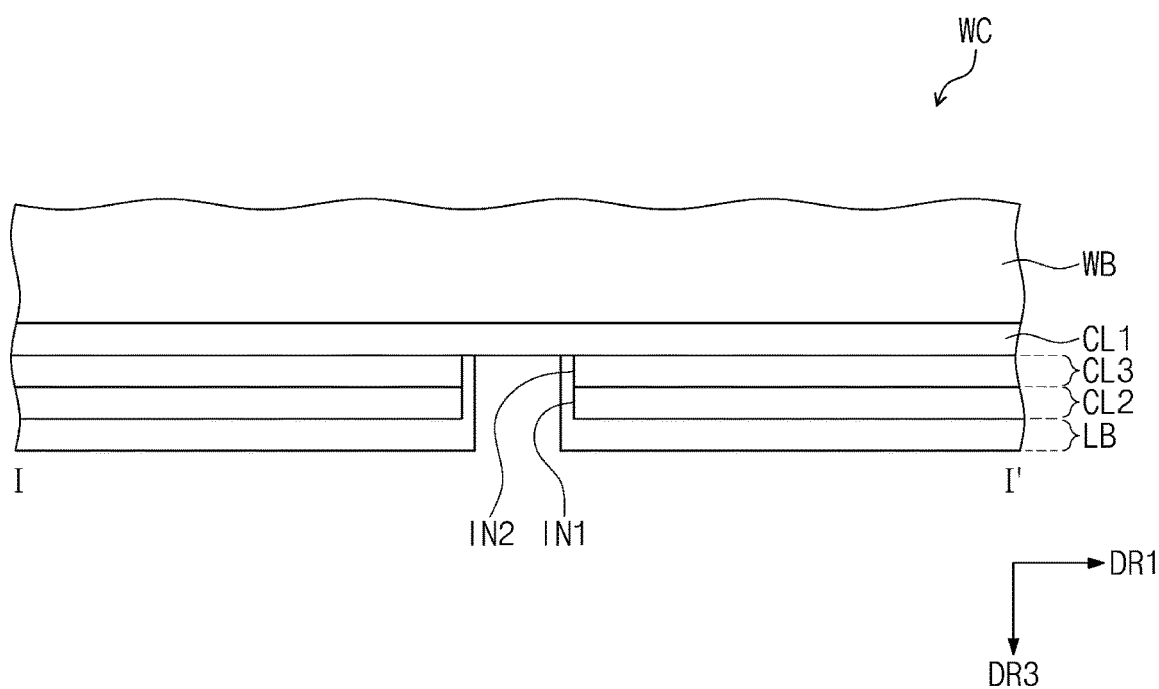
FIG. 11 is a schematic cross-sectional view corresponding to the line I-I' of FIG. 2 in accordance with yet another embodiment.

FIG. 10 is a schematic cross-sectional view corresponding to the line I-I' of FIG. 2 in accordance with one embodiment. FIG. 11 is a schematic cross-sectional view corresponding to the line I-I' of FIG. 2 in accordance with one embodiment.

Referring to FIGS. 9A, 9B, 10, and 11, a portion of the light-blocking layer LB may cover at least a portion of the inner sidewall IN2 of the third opening OP3 and an inner sidewall IN1 of the first opening OP1 (FIG. 10). In some embodiments, the portion of the light-blocking layer LB may cover the entire inner sidewalls IN1, IN2 and contact the first color layer CL1 (FIG. 11). In this case, the icon layer IL may fill remaining portions of the first and third openings OP1 and OP3 except portions filled with the light-blocking layer LB. In other words, the first and third openings OP1 and OP3 may be completely filled with the icon layer IL and the light-blocking layer LB.

Figure 12:
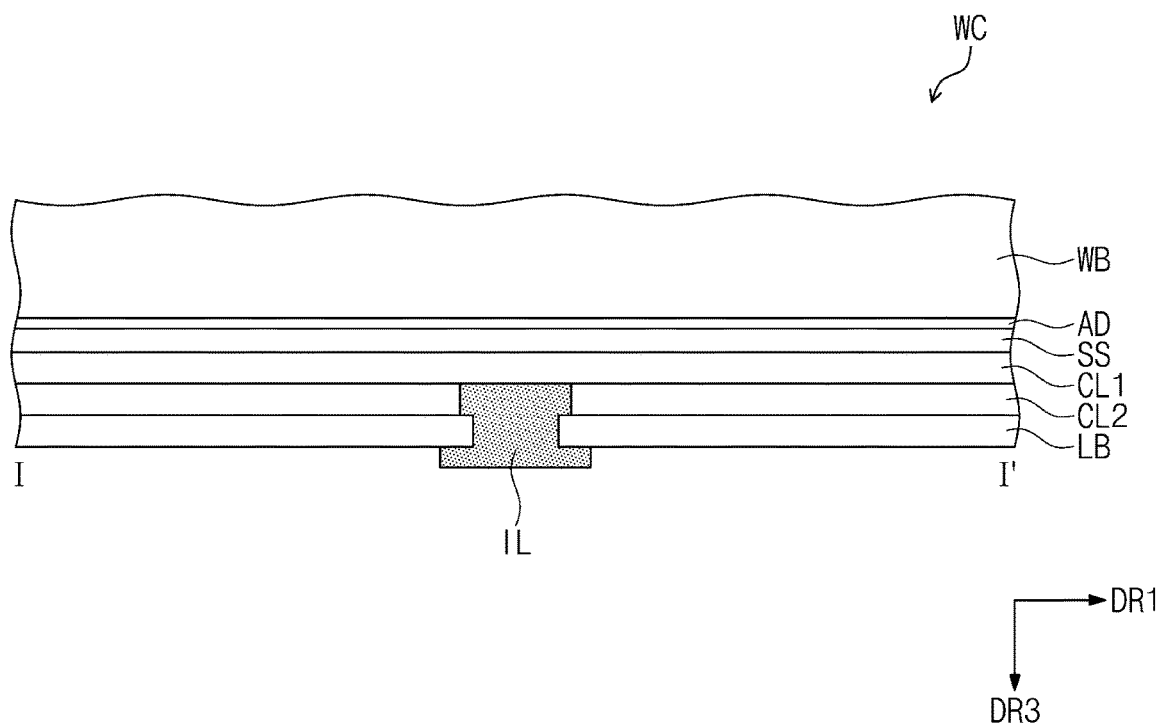
FIG. 12 is a schematic cross-sectional view corresponding to the line I-I' of FIG. 2 in accordance with yet another embodiment.

FIG. 12 is a schematic cross-sectional view corresponding to the line I-I' of FIG. 2 in accordance with one embodiment.

Referring to FIG. 12, the first color layer CL1 may not be formed directly on the window base substrate WB. For example, the window cover WC may further include a sub-substrate layer SS disposed between the window base substrate WB and the first color layer CL1, and an adhesive layer AD may be disposed between the sub-substrate layer SS and the window base substrate WB. In other words, the first color layer CL1, etc. may be disposed on the sub-substrate layer SS, and then, the sub-substrate layer SS having the first color layer CL1, etc. may be disposed on the window base substrate WB by using the adhesive layer AD.

The sub-substrate layer SS may use a general substrate known in the art, for example, a polymer resin layer.

Figure 13:
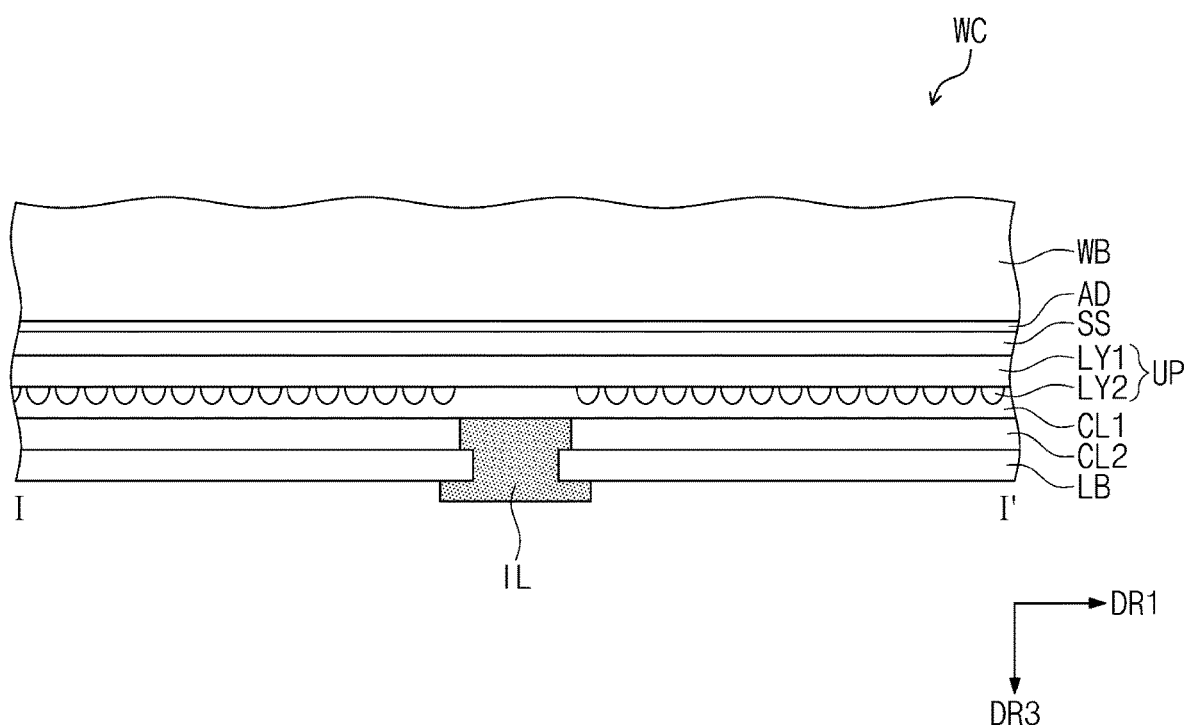
FIG. 13 is a schematic cross-sectional view corresponding to the line I-I' of FIG. 2 in accordance with yet another embodiment.

FIG. 13 is a schematic cross-sectional view corresponding to the line I-I' of FIG. 2 in accordance with one embodiment.

Referring to FIG. 13, the window cover WC may further include an ultraviolet (UV) pattern layer UP disposed between the sub-substrate layer SS and the first color layer CL1. The UV pattern layer UP may be a layer including a pattern such as a wave pattern. For example, the UV pattern layer UP may include a base layer LY1 and a UV pattern LY2 disposed on the base layer LY1. The UV pattern layer UP may be formed using an ultraviolet curable resin. A shape of the UP pattern LY2 in FIG. 13 is illustrated as an example. However, embodiments of the present disclosure are not limited thereto. The UV pattern LY2 may be a three-dimensional or molding pattern formed using, for example, a decoration pattern or a fine hair-line. The non-active area NAA of FIG. 2 may have texture or haze by the UV pattern layer UP.

The UV pattern LY2 may not overlap with the first and second openings OP1 and OP2 when viewed in a plan view. Thus, it is possible to prevent the UV pattern LY2 from being visible to a user.

The UV pattern LY2 may be covered by the first color layer CL1. After the UV pattern LY2 is formed, the first color layer CL1 may be formed on the UV pattern LY2 by the silk-screen printing process.

Figure 14:
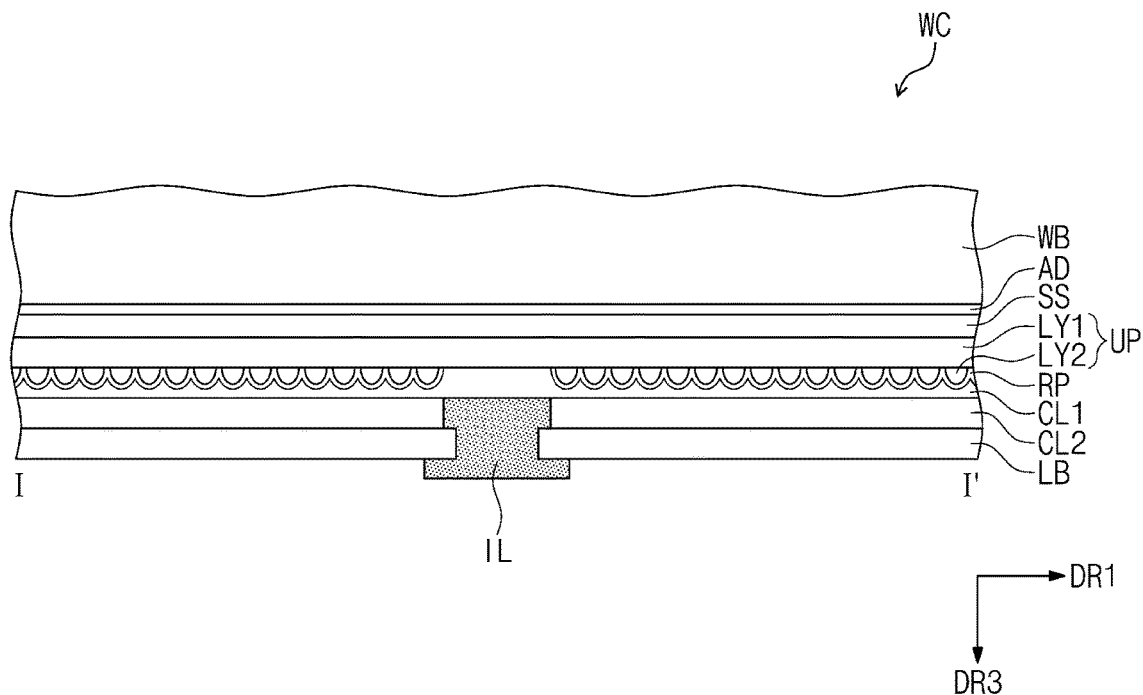
FIG. 14 is a schematic cross-sectional view corresponding to the line I-I' of FIG. 2 in accordance with yet another embodiment.

FIG. 14 is a schematic cross-sectional view corresponding to the line I-I' of FIG. 2 in accordance with one embodiment.

Referring to FIG. 14, the window cover WC may further include a reflection pattern layer RP that covers at least a portion of the UV pattern layer UP. For example, the reflection pattern layer RP may cover the UV pattern LY2. The reflection pattern layer RP may be formed by a deposition process or a coating process. However, embodiments of the present disclosure are not limited thereto. In certain embodiments, the reflection pattern layer RP may be formed by printing a reflection ink. The reflection pattern layer RP may realize a color or metallic feeling of the non-active area NAA of FIG. 2. The reflection pattern layer RP may include a metal having a reflectivity, such as aluminum, gold, or silver.

In some embodiments, the reflection pattern layer RP may not overlap with the first and second openings OP1 and OP2 when viewed in a plan view.

The reflection pattern layer RP may have a multi-layered structure in which a low refractive index layer and a high refractive index layer are alternately stacked. For example, the reflection pattern layer RP may have a multi-layered structure in which a layer including titanium oxide ($TiO_2$) and a layer including silicon oxide ($SiO_2$) are alternately stacked.

The light-blocking layer LB may have a substantially black color. For example, the light-blocking layer LB may be a printed layer that is called 'a black matrix'. The light-blocking layer LB may block light provided to an area except the second opening OP2. In some embodiments, the color of the light-blocking layer LB may be changed into another color capable of effectively blocking light, not a black color.

Each of the first and second color layers CL1 and CL2 may include at least one of a metal particle, a pearl pigment, or a mirror ink. In the embodiment in which the window cover WC further includes the third color layer CL3 as described above, the third color layer CL3 may also include at least one of a metal particle, a pearl pigment, or a mirror ink. For example, the metal particle may be an aluminum particle or a silver particle. The pearl pigment may have a silver, white, gold, or blue color. Light inputted to the first color layer CL1, the second color layer CL2, etc. may be irregularly reflected by the metal particle, the pearl pigment, and/or the mirror ink, thereby realizing a three-dimensional effect or metallic feeling.

Figure 15:
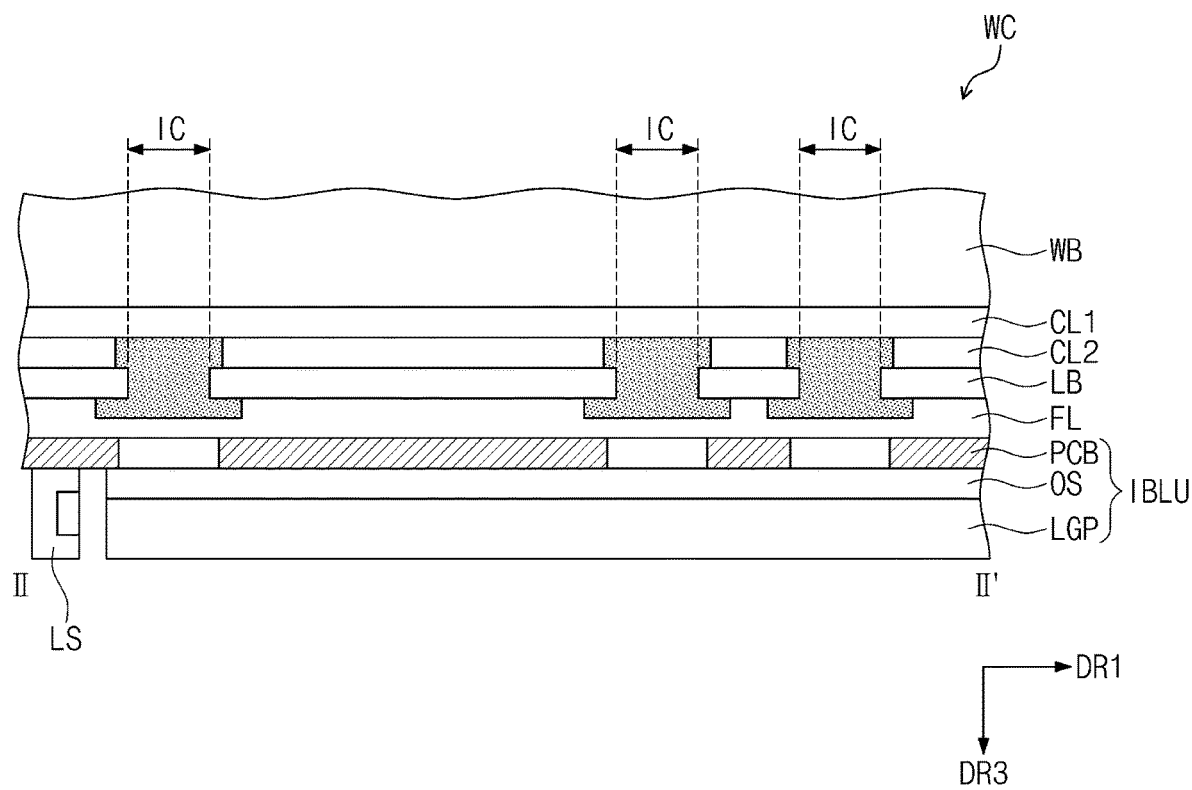
FIG. 15 is a schematic cross-sectional view corresponding to a line II-II' of FIG. 2.

FIG. 15 is a schematic cross-sectional view corresponding to a line II-II' of FIG. 2.

As described above, the icon is visible to a user only in the specific mode in the display device DD of FIG. 1 according to the embodiment of the present disclosure. To achieve this, referring to FIGS. 2, 4, and 15, the display device DD of FIG. 1 according to the embodiment may further include an icon backlight unit IBLU. The icon backlight unit IBLU is disposed under the light-blocking layer LB and the icon layer IL.

The icon backlight unit IBLU provides light to the non-active area NAA of the window cover WC but does not provide light to the active area AA of the window cover WC. Light outputted from the display panel DP disposed under the window cover WC is provided to the active area AA. In more detail, the icon backlight unit IBLU provides the light to the icon area IA of the non-active area NAA.

When the icon backlight unit IBLU is driven, the light is provided to the icon area IA, and thus a user can view or recognize the icon. When the icon backlight unit IBLU is in an off state, the light is not provided to the icon area IA, and thus a user does not clearly view or recognize the icon. Since the icon area IA is covered by the first color layer CL1 as described above, the icon may not be visible to a user in the off state of the icon backlight unit IBLU.

The icon backlight unit IBLU may include a printed circuit board PCB, a light source LS, a light guide plate LGP, and an optical sheet OS. The light source LS is disposed on a bottom surface of the printed circuit board PCB. The light source LS may include at least one light emitting diode. Light emitted from the light source LS is provided into the light guide plate LGP and is then outputted in a front direction of the display device DD of FIG. 1. The optical sheet OS may be disposed on a top surface of the light guide plate LGP. The optical sheet OS is disposed between the printed circuit board PCB and the light guide plate LGP. The optical sheet OS may include a single sheet or a plurality of sheets.

Even though not shown in the drawings, a reflection sheet may be disposed under the light guide plate LGP. The reflection sheet may reflect light, leaked through a bottom surface of the light guide plate LGP, toward the light guide plate LGP. Thus, light efficiency of the icon backlight unit IBLU may be improved.

The icon backlight unit IBLU may be fixed to the window cover WC with an icon adhesive layer FL interposed therebetween. Alternatively, the icon backlight unit IBLU may be spaced apart from the window cover WC and/or may be disposed below the display panel DP.

When the icon backlight unit IBLU is driven, the icon may be luminous through the window cover WC and a shape IC of the icon may be the same as the shape of the second opening OP2. In other words, the light provided from the icon backlight unit IBLU may be outputted outward through the second opening OP2, and thus the icon corresponding to the shape of the second opening OP2 may be visible to a user.

Figure 16:
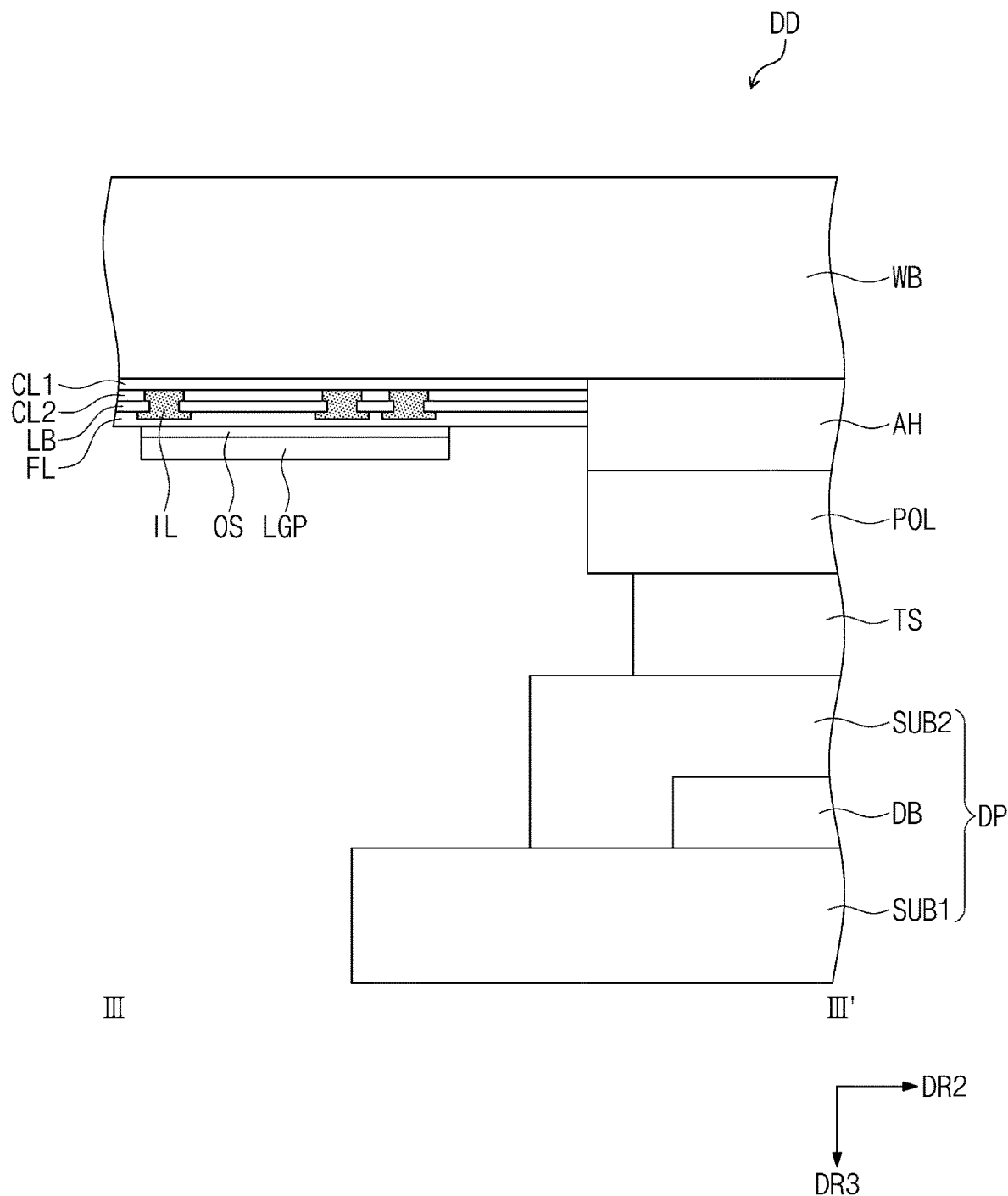
FIG. 16 is a schematic cross-sectional view corresponding to a line III-III' of FIG. 2.

FIG. 16 is a schematic cross-sectional view corresponding to a line III-III' of FIG. 2.

Referring to FIGS. 15 and 16, the light source LS of the icon backlight unit IBLU does not overlap with the display panel DP when viewed in a plan view. For example, the display panel DP may include a first substrate SUB1, a display layer DB disposed on the first substrate SUB1, and a second substrate SUB2 disposed on the display layer DB. The display layer DB may be a general one known in the art. For example, the display layer DB may include an organic light-emitting element or may include a liquid crystal layer. When the display layer DB includes the organic light-emitting element, the display device DD of FIG. 1 according to an embodiment may be an organic electro-luminescence display device. On the other hand, when the display layer DB includes the liquid crystal layer, the display device DD may be a liquid crystal display device.

The second substrate SUB2 and the first substrate SUB1 may seal the display layer DB. Even though not shown in the drawings, the first substrate SUB1 and the second substrate SUB2 may be bonded to each other by using a sealant. The second substrate SUB2 may be a sealing member and may have a multi-layered structure in which an organic layer and an inorganic layer are alternately stacked. An area of the second substrate SUB2 may be smaller than an area of the first substrate SUB1.

The display device DD of FIG. 1 according to an embodiment may further include at least one of general elements known in the art. For example, the display device DD may further include a touch sensing unit TS and a polarizing member POL.

The touch sensing unit TS may be disposed on the second substrate SUB2. The touch sensing unit TS may be disposed directly on the second substrate SUB2, as illustrated in FIG. 16. However, embodiments of the inventive concepts are not limited thereto. In certain embodiments, the touch sensing unit TS may be disposed on the second substrate SUB2 with an adhesive layer interposed therebetween. The polarizing member POL may be disposed on the touch sensing unit TS. When the display layer DB includes the organic light-emitting element, the polarizing member POL may perform an anti-reflection function with respect to external light. An adhesive member AH may be disposed between the polarizing member POL and the window cover WC. The cross-sectional view of FIG. 16 is illustrated as an example. However, embodiments of the present disclosure are not limited thereto. In certain embodiments, a stacking order of the polarizing member POL and the touch sensing unit TS may be changed as needed.

Referring again to FIGS. 1 to 16, an embodiment of the present disclosure provides the display device which includes the display panel DP, and the window cover WC disposed on the display panel DP and including the icon area IA and the active area AA. The window cover WC includes the window base substrate WB, the multi-layered color layer CL1, CL2, and LB (the light-blocking layer LB is sometimes called a color layer LB) disposed on the window base substrate WB and overlapping with the icon area IA, and the icon layer IL disposed at a lower side of the color layer CL1, CL2, and LB. The color layer CL1, CL2, and LB includes a lower layer CL1 covering the icon area IA, at least one intermediate layer CL2 in which an intermediate opening OP1 overlapping with the icon area IA is defined, and an upper layer LB in which an upper opening OP2 overlapping with the intermediate opening OP1 is defined. A portion of the upper layer LB covers at least a portion of the inner sidewall IN1 of the intermediate opening OP1.

Meanwhile, the same or similar elements as described with reference to FIGS. 1 to 16 are indicated by the same reference designators, and the descriptions thereto are omitted for the purpose of ease and convenience in explanation and illumination.

Descriptions to the elements such as the display panel DP and the window cover WC are the same as described above and are omitted.

The display device according to an embodiment of the present disclosure includes the window cover including the icon area, and the icon luminous through the icon area is clearly visible to a user in the specific mode. In more detail, the icon is clearly visible to a user only in the mode in which light is provided to the icon area. Generally, color layers disposed on a window cover may cover an icon area in order that an icon is not clearly visible to a user in a mode in which light is not provided. In this case, it is difficult to increase a light transmittance of the icon area as compared with a light transmittance of a color of the color layer.

In the display device according to an embodiment of the present disclosure, the opening overlapping with the icon area may be defined in the color layer, not adjacent to the window base substrate, of the plurality of color layers. Thus, a transmittance may be improved. In addition, since the display device includes the structure in which the icon layer fills the openings, the color of the icon may be variously controlled according to the material of the icon layer.

Meanwhile, in a case in which color layers include metal particles in a conventional art, metal particles may be visible to a user when an icon area is luminous. However, in the display device according to an embodiment of the present disclosure, the opening is defined in the color layer not adjacent to the window base substrate, thereby reducing a ratio of the layer including the metal particles. In addition, the icon layer filling the opening is provided to induce diffusion and irregular reflection of light, and thus it is possible to prevent or minimize the problem that the metal particles are visible.

In the display device according to an embodiment of the present disclosure, the transmittance and color feeling of the icon can be easily controlled as needed, and the icon is visible to a user only in the specific mode.

While the inventive concepts have been described with reference to example embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A display device comprising:
a display panel; and
a window cover that is disposed on the display panel and includes an active area and an icon area,
wherein the window cover comprises:
a window base substrate;
a multi-layered color layer that is disposed between the window base substrate and the display panel, and overlaps with the icon area; and
an icon layer disposed between the multi-layered color layer and the display panel,
wherein the multi-layered color layer comprises:
a lower layer covering the icon area;

at least one intermediate layer in which an intermediate opening overlapping with the icon area is defined; and an upper layer in which an upper opening overlapping with the intermediate opening is defined, wherein the upper layer includes a light-blocking material; and a portion of the upper layer covers at least a portion of an inner sidewall of the intermediate opening.

2. The display device of claim 1, wherein a portion of the upper layer is in contact with the lower layer.

3. The display device of claim 1, wherein each of the lower layer and the intermediate layer has a first color, and wherein the icon layer has a second color different from the first color.

4. The display device of claim 3, wherein the first color and the second color complement each other.

5. The display device of claim 1, wherein the icon layer comprises:

a first sub-icon layer disposed at the intermediate opening; and a second sub-icon layer disposed at the upper opening.

6. The display device of claim 5, wherein the icon layer further comprises:

a third sub-icon layer disposed under a bottom surface of the upper layer, wherein a width of the third sub-icon layer is greater than a width of the first sub-icon layer and a width of the second sub-icon layer.

7. The display device of claim 1, further comprising:

a sub-substrate layer disposed between the window base substrate and the lower layer; and an adhesive layer disposed between the window base substrate and the sub-substrate layer.

8. The display device of claim 7, further comprising:

an ultraviolet (UV) pattern layer disposed between the sub-substrate layer and the lower layer.

9. The display device of claim 8, further comprising:

a reflection pattern layer covering at least a portion of the UV pattern layer.

10. The display device of claim 1, wherein the upper layer has a black color.

11. The display device of claim 1, wherein each of the lower layer and the intermediate layer includes at least one of a metal particle, a pearl pigment, or a mirror ink.

12. The display device of claim 1, further comprising:

an icon backlight unit disposed on the upper layer and the icon layer.

13. The display device of claim 12, wherein the icon backlight unit is fixed to the window cover.

14. The display device of claim 12, wherein the icon backlight unit comprises a light source, and wherein the light source does not overlap with the display panel when viewed in a plan view.

15. A display device comprising:

a display panel; and a window cover that is disposed on the display panel and includes an active area and an icon area, wherein the window cover comprises:

a window base substrate; and a multi-layered color layer that is disposed between the window base substrate and the display panel, and overlaps with the icon area, wherein the multi-layered color layer comprises:

a lower layer covering the icon area;

at least one intermediate layer in which an intermediate opening overlapping with the icon area is defined; and an upper layer in which an upper opening overlapping with the intermediate opening is defined, wherein the upper layer includes a light-blocking material; and a portion of the upper layer covers at least a portion of an inner sidewall of the intermediate opening.

16. A display device comprising:

a display panel; and a window cover that is disposed on the display panel and includes an active area and an icon area, wherein the window cover comprises:

a window base substrate;

a multi-layered color layer that is disposed between the window base substrate and the display panel, and overlaps with the icon area; and an icon layer disposed between the multi-layered color layer and the display panel, wherein the multi-layered color layer comprises:

a lower layer covering the icon area;

at least one intermediate layer in which an intermediate opening overlapping with the icon area is defined; and an upper layer in which an upper opening overlapping with the intermediate opening is defined;

and a portion of the upper layer covers at least a portion of an inner sidewall of the intermediate opening.

* * * * *